(12) United States Patent
McGucken, III

(10) Patent No.: US 10,542,820 B2
(45) Date of Patent: Jan. 28, 2020

(54) RECLINING SWIVEL PORTABLE HUNTING CHAIR AND SYSTEM

(71) Applicant: Robert McGucken, III, Weston, WI (US)

(72) Inventor: Robert McGucken, III, Weston, WI (US)

(73) Assignee: Robert McGucken, III, Weston, WI (US)

( * ) Notice: Subject to any disclaimer, the term of this patent is extended or adjusted under 35 U.S.C. 154(b) by 0 days.

(21) Appl. No.: 16/024,191

(22) Filed: Jun. 29, 2018

(65) Prior Publication Data
US 2020/0000084 A1    Jan. 2, 2020

(51) Int. Cl.
| | | |
|---|---|---|
| *A47C 3/18* | (2006.01) |
| *A47C 7/62* | (2006.01) |
| *A47C 1/032* | (2006.01) |
| *A47C 1/14* | (2006.01) |
| *A01M 31/02* | (2006.01) |

(52) U.S. Cl.
CPC ............. *A47C 3/18* (2013.01); *A01M 31/025* (2013.01); *A47C 1/03244* (2013.01); *A47C 1/14* (2013.01); *A47C 7/622* (2018.08)

(58) Field of Classification Search
CPC ......... A47C 3/18; A47C 1/03244; A47C 1/14; A47C 1/146; A01M 31/025
See application file for complete search history.

(56) References Cited

U.S. PATENT DOCUMENTS

| | | | | |
|---|---|---|---|---|
| 4,482,184 A * | 11/1984 | Mincey | .................. | A47C 4/22 297/28 |
| 4,597,119 A * | 7/1986 | Padgett | .................. | A47C 1/14 5/656 |
| 4,824,170 A * | 4/1989 | Goldmeier | ............. | A47C 1/143 248/349.1 |
| 5,078,451 A * | 1/1992 | Sobel | ....................... | A47C 1/14 248/425 |
| 5,364,163 A * | 11/1994 | Hardison | ................. | A47C 3/18 297/344.21 |
| 5,567,014 A * | 10/1996 | Fitch | ........................ | A47C 3/18 297/344.21 |
| 5,580,129 A * | 12/1996 | Findlay | ................ | A47C 1/0265 248/349.1 |
| 6,315,360 B1* | 11/2001 | Guerrini | .................. | A47C 1/14 297/344.21 |
| 6,773,070 B2 | 8/2004 | Worledge et al. | | |
| 6,890,033 B1* | 5/2005 | Casella | .................... | A47C 1/14 297/344.21 |
| 7,325,875 B1* | 2/2008 | Guerrini | .................. | A47C 1/14 297/344.21 |
| 7,328,952 B2* | 2/2008 | Guerrini | .................. | A47C 1/14 297/344.21 |
| 7,717,514 B2 | 5/2010 | Redmann | | |
| 8,167,374 B2* | 5/2012 | Findlay | .................... | A47C 3/18 297/344.21 |

(Continued)

*Primary Examiner* — David R Dunn
*Assistant Examiner* — Tania Abraham
(74) *Attorney, Agent, or Firm* — Casimir Jones, S.C.; Kirk J. Hogan

(57) ABSTRACT

Provided herein are compositions, systems, kits, methods and uses for a chair designed for outdoor use. In particular, provided herein are compositions, systems, kits, methods and uses wherein a swivel mounted chair reclines while maintaining a user's center of gravity.

17 Claims, 12 Drawing Sheets

(56) References Cited

U.S. PATENT DOCUMENTS

| | | | |
|---|---|---|---|
| 8,474,916 B2 * | 7/2013 | Smith | A47C 3/18 |
| | | | 297/16.1 |
| 8,544,809 B1 * | 10/2013 | Laurita | A47C 3/18 |
| | | | 248/346.01 |
| 8,899,682 B2 * | 12/2014 | Nilsson | A47C 3/18 |
| | | | 297/344.24 |
| 92,047,258 | 12/2015 | Kania et al. | |
| 9,301,620 B2 | 4/2016 | Emrich | |
| 2009/0243345 A1 | 10/2009 | Carter et al. | |
| 2010/0019550 A1 | 1/2010 | Cook et al. | |
| 2013/0161990 A1 * | 6/2013 | Oleson | B64D 11/06 |
| | | | 297/344.21 |
| 2015/0230612 A1 | 8/2015 | Weber, Jr. | |
| 2016/0325837 A1 * | 11/2016 | Erhel | B64D 11/064 |
| 2017/0000261 A1 * | 1/2017 | Block | A47C 1/0265 |

* cited by examiner

RECLINING SWIVEL PORTABLE HUNTING CHAIR AND SYSTEM

FIELD

Provided herein are compositions, systems, kits, methods and uses for a chair for outdoor use. In particular, provided herein are compositions, systems, kits, methods and uses wherein a swivel mounted chair reclines while maintaining a safe and stable configuration independent of the recline of the chair.

BACKGROUND

Conventional outdoor use chair and systems comprise one of two categories. The first category comprises low profile, coffin-style layout blinds for field hunting waterfowl made of, for example, a 16-20 inches high aluminum frame enclosed within a camouflage fabric skirt. The aluminum frame provides structure for the enclosure, and a sloping back support for the upper torso of the user. The aluminum frame may also comprise a trap door system that conceals the top of the user, and is opened by the user when ready to shoot. In use of these chairs and systems, the user lays supine and straight-legged within the blind, with their back in a semi-upright position supported by a sloping back support. Not only is the straight legged, semi-supine position awkward and uncomfortable but, in addition, the user's shooting opportunities are restricted to the area directly in front and to the left of the user for right handed shooters, and restricted to the area directly in front and to the right for left handed shooters. While low profile, coffin-style layout blinds provide concealment, they are uncomfortable and severely restrict the user's horizontal and vertical field of view shooting opportunities.

The second category of conventional hunting chair and systems comprise a chair or stool with or without a swivel base. These systems may provide greater comfort than coffin style layout blinds and a less restrictive shooting zone, but have a much higher above ground profile and therefore provide less concealment. Moreover, when a user changes the reclining angle of a chair back support of a chair with a swivel base, the user's center of gravity shifts relative to the swivel and base, and thereby generates an unstable and unsafe posture for the user and others nearby. Accordingly, what is needed to accommodate all potential hunting situations for all species of game is a portable hunting chair and system that provides a stable, comfortable and adjustable seat, and an adjustable seat back recline angle, with the capacity to swivel a full 360 degrees whether in the low-profile full-recline position, in the high-profile position, or in any position in-between.

SUMMARY

Provided herein are compositions, systems, kits, methods and uses for a chair designed for outdoor use. In particular, provided herein are compositions, systems, kits, methods and uses wherein a swivel mounted chair reclines while maintaining a safe and stable configuration independent of the recline of the chair.

In some embodiments, the present disclosure provides a chair for outdoor use comprising a seat, a seat back and arm rests, a seat back support, a left top rail, comprising a stationary bracket and a sliding bracket, a right top rail comprising a stationary bracket and a sliding bracket, a front upper cross brace affixed to the left top rail and to the right top rail, a rear upper cross brace affixed to the left top rail and to the right top rail, a left leg comprising a front foot and a rear foot, a right leg comprising a front foot and a rear foot, a front lower cross brace affixed to the left leg and to the right leg, a rear lower cross brace affixed to the left leg and to the right leg, and a swivel affixed to the front upper cross brace and the lower cross brace and affixed to the rear upper cross brace and the rear lower cross brace. In certain embodiments, at least one sliding bracket and at least one top rail comprise at least one chair back angle adjustment aperture. In other embodiments, at least one sliding bracket and at least one top rail comprise at least one folding transport aperture. In further embodiments, the chair for outdoor use comprises at least one arm rest. In particular embodiments, the arm rest comprises at least one seat angle adjustment slot. In still further embodiments, the chair for outdoor use comprises a camouflage fabric top shroud. In given embodiments, the camouflage fabric top shroud comprises a camouflage window netting, a natural vegetation retaining strap, and a natural vegetation retaining strap anchor point. In some embodiments, the chair for outdoor use comprises a seat sling. In other embodiments, the chair for outdoor use comprises a seat back sling. In other embodiments, the chair for outdoor use comprises a backpack strap and/or a back pack strap buckle. In certain embodiments, the chair for outdoor use comprises a Camouflage side and rear apron. In particular embodiments, the camouflage apron comprises a side apron hook and loop fastener, or a grommet. In some embodiments, the chair for outdoor use comprises one or more leg extensions configured to be reversible affixed to one or more of the front foot of the left leg, the rear foot of the left leg, the front foot of the right leg, and the rear foot of said right leg. In some embodiments, the vertical axis at the center of the swivel is forward of the intersection of a first straight line drawn from the right front corner of the right top rail to the left rear corner of the left top rail and a second straight line drawn from the left front corner of the left top rail to the right rear corner of the right top rail.

In some embodiments, the present disclosure provides a kit comprising a chair for outdoor use comprising a seat frame, a seat back frame and arm rests, a seat back support, a left top rail, comprising a stationary bracket and a sliding bracket, a right top rail comprising a stationary bracket and a sliding bracket, a front upper cross brace affixed to the left top rail and to the right top rail, a rear upper cross brace affixed to the left top rail and to the right top rail, a left leg comprising a front foot and a rear foot, a right leg comprising a front foot and a rear foot, a front lower cross brace affixed to the left leg and to the right leg, a rear lower cross brace affixed to the left leg and to the right leg, and a swivel affixed to the front upper cross brace and the front lower cross brace and affixed to the rear upper cross brace and the rear lower cross brace, and one or more of a leg extension, a camouflage top shroud, a camouflage apron, spare and/or replacement parts and pins, a lubricant, a cleaning solution, linkages to attach other outdoor and hunting apparatuses, a beverage holder, detachable pockets, seat padding, flotation devices, a carrying case, packaging and instructions for use.

In some embodiments, the present disclosure provides a system comprising a chair for outdoor use comprising a seat frame, a seat back frame and arm rests, a seat back support, a left top rail, comprising a stationary bracket and a sliding bracket, a right top rail comprising a stationary bracket and a sliding bracket, a front upper cross brace affixed to the left top rail and to the right top rail, a rear upper cross brace affixed to the left top rail and to the right top rail, a left leg comprising a front foot and a rear foot, a right leg comprising a front foot and a rear foot, a front lower cross brace affixed to the left leg and to the right leg, a rear lower cross brace affixed to the left leg and to the right leg, and a swivel affixed to the front upper cross brace and the front lower cross brace and affixed to the rear upper cross brace and the rear lower cross brace, and one or more of a leg extension, a camouflage top shroud, a camouflage apron, spare and/or replacement parts and pins, a lubricant, a cleaning solution, linkages to attach other outdoor and hunting apparatuses, a beverage holder, detachable pockets, seat padding, flotation devices, a carrying case, packaging and instructions for use.

REFERENCE NUMBERS

Figure 1:
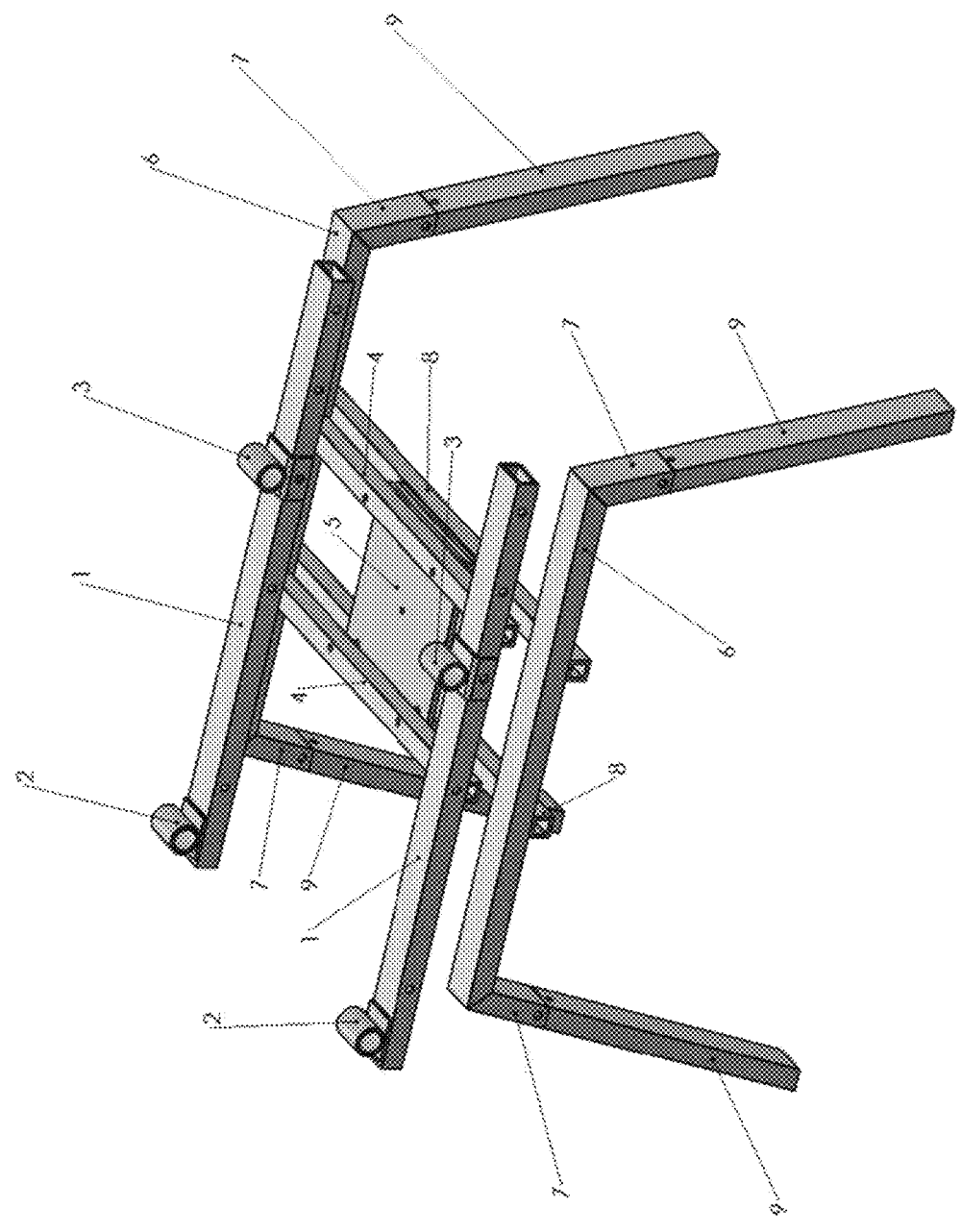
FIG. 1 shows a perspective side view of one embodiment of the invention. The user's front is facing to the right of the figure.

1 Top rail
2 Stationary bracket
3 Sliding bracket
4 Upper cross brace
5 Swivel
6 Leg
7 Foot
8 Lower cross brace
9 Leg extension
10 Seat frame
11 Seat back frame
12 Seat back support
13 Seat back angle adjustment aperture
14 Folding transport aperture
15 Arm rest
16 Seat angle adjustment slots
17 Camouflage fabric top shroud
18 Camouflage window netting
19 Natural vegetation retaining strap
20 Natural vegetation retaining strap anchor point
21 Seat sling
22 Seat back sling
23 Backpack strap
24 Backpack strap buckle
25 Grommet
26 Side and rear apron hook and loop fastener
27 Camouflage fabric side and rear apron
28 Seat angle adjustment stud
29 Shaft collar
30 Shaft collar locking pin

DEFINITIONS

To facilitate an understanding of the present disclosure, a number of terms and phrases are defined below:

As used herein, "chair" refers to a seat frame, plus a seat back frame. In some embodiments, the chair further comprises one or more arm rests. In other embodiments, the chair further comprises one or more of an arm rest, a seat sling, and/or a seat back sling.

As used herein, "upper frame" refers to top rails plus stationary brackets. In some embodiments, the upper frame further comprises one or more top cross braces.

As uses herein, "lower frame" refers to legs plus feet. In some embodiments, lower frame further comprises one or more cross braces.

As used herein, a "grommet" is a ring of rubber, plastic, metal or other material placed inside a hole.

DETAILED DESCRIPTION OF THE DISCLOSURE

Provided herein are compositions, systems, kits, methods and uses for a chair designed for outdoor use. In particular, provided herein are compositions, systems, kits, methods and uses wherein a swivel mounted chair reclines while maintaining stability in all recline positions.

In some embodiments, an outdoor use chair and system of the present invention comprises a swivel chair and a layout blind in a light weight, compact and portable blind and system that may be transported to and from an outdoor destination using integrated backpack straps. In certain embodiments, the present invention provides a stable and adjustable reclining chair on a 360 degree swivel base, thereby assuring hunter comfort and safety. In further embodiments, the present invention provides 360 degree shooting opportunities whether in a fully reclined low profile position, an upright high profile position, or any position in between. Changing the recline angle of the chair changes the user's center of gravity relative to the swivel. When the user's center of gravity is not centered over the top of the swivel, an unstable tipping configuration may be generated. In particular embodiments, the present invention corrects for the problem of instability that arises when a user's center of gravity is not centered over the swivel. Changing the recline angle of a conventional outdoor chair shifts the hunter's center of gravity relative of the swivel, and destabilizes the chair. When the user's center of gravity is cantilevered in front of the swivel as occurs in a fully reclined position, the upper frame flexes downwards and may make contact with a lower frame, and thereby prevent the upper frame from swiveling on the lower frame. In specific embodiments of the present invention, the swivel assembly is mounted front of center on the upper frame to minimize cantilever effects and downward flexion of the upper frame. In certain embodiments, the top rails are assembled from high tensile strength aluminum to preclude flexing of the top rails. The forward mounted swivel and high tensile strength top rails assure that the chair's upper frame rotates freely on the lower frame in all recline angles.

In some embodiments, an outdoor use chair and system of the present invention comprises an integrated 360 degree swivel that allows a user to view a full 360 horizontal degrees from the supine, semi-supine, or upright position. Conventional waterfowl layout blinds constrain the shooting opportunities for the hunter. In a layout blind, the hunter lays in a supine or semi-supine position which severely restricts the potential target zone of the hunter. Due to ergonomic constraints, a right handed hunter is only able to shoot at birds to the front and left of their seated position. Similarly, a left handed shooter is restricted to shooting at birds to the front and right side of their seated position. Accordingly, hunters are only able to safely shoot at birds in a 90 degree arc to the front and side of the direction they are facing. Of the horizontal 360 degree potential shooting opportunities, 270 degrees are inaccessible to the hunter using a conventional waterfowl layout blind. Moreover, if a hunter were to try to quickly stand up to expand their field of view, and to target birds beyond their 90 degree field of view, the birds will be out of range by the time the hunter is able to stand and attempt a shot. In some embodiments, an outdoor use chair and system of the present invention comprises an integrated 360 degree swivel that allows a user to view and shoot a full 360 horizontal degrees from the supine, semi-supine, or upright position.

In some embodiments, an outdoor use chair and system of the present invention comprises a low profile in, for example, a fully reclined position. Wild game species typically avoid areas and objects that do not appear to be a part of their natural environment. In certain embodiments, the present invention minimizes the silhouette on the horizon. In other embodiments, the present invention comprises a camouflage apron which encircles the chair. In particular embodiments, the present invention comprises a camouflage shroud over the top of a user. In further embodiments, the present invention comprises a low profile design (for example, an 18" vertical profile) achieved by: 1) use of a low profile swivel (for example, a swivel spanning ¾ inches from top to bottom); 2) mounting the swivel to the bottom of the bottom frame rather than to the top side of the bottom frame; 3) adjusting the chair back to a full recline position such that the top of the chair back is in a lower position than if in the upright configuration; and 4) a foot height on the bottom frame of approximately 3 inches from the ground.

In some embodiments, an outdoor use chair and system of the present invention allows the user to adjust the recline angle of the seat back, and to adjust the angle between the seat and the seat back using seat angle adjustment slots provided in the arm rests. Conventional layout blinds require the user to lay straight-legged in a supine or semi-supine position. This position severely restricts the user's vertical and horizontal fields of view, thereby limiting the user's ability to spot incoming game. The lack of vision and discomfort of conventional blinds frequently forces the user to move in attempts to identify incoming game, or in attempts to achieve a position of greater comfort. Accordingly, conventional blinds add to the user's challenges to remain motionless, and to avoid scaring game animals that may be nearby. In certain embodiments, the recline angle of the seat back is adjusted by moving the sliding brackets along the top rails to the preferred recline angle. In some embodiments, the sliding brackets and/or the top rails comprise one or more bearings in a closed or open bearing system. In other embodiments, the sliding brackets and/or top rails comprise low friction components that assure movement without binding. In particular embodiments, once the chosen recline angle is achieved, a pin is inserted through the sliding bracket, and through the corresponding top rail to affix the recline angle at the desired position. In further embodiments, the seat angle adjustment slot may be chosen and reversibly affixed to a chair frame stud, thereby allowing the user to select from a diversity of comfortable bent knee positions. In certain embodiments, a clamp and levered locking arm and/or cam-locking apparatus is used to fix the angle of recline. Hunting from a comfortable position assures that a hunter is able to remain motionless for longer periods of time, and enjoy greater hunting success.

In some embodiments, an outdoor use chair and system of the present invention can be transformed from a low profile, maximum recline position (for example, a preferred position for waterfowl field hunting), to an intermediate profile semi-upright position (for example, a preferred position for turkey or predator hunting), to a high profile upright position (for example, a preferred position for deer hunting). Conventional chairs, systems and blinds have a single fixed configuration, and are only useful for hunting a single particular species in a single specific situation. For example, waterfowl field hunting often demands that the hunter maintain a low profile with an upward field of view, whereas turkey hunting often demands a low profile semi-upright position to allow the hunter to maximize shooting opportunities at ground level. Conventional blinds do not provide versatility to pursue multiple species. In certain embodiments, the present invention allows the user to adjust the recline angle and thereby to determine a chosen height profile of the chair. In further embodiments, leg extensions are added to generate greater elevation above ground level. In particular embodiments, the recline angle is adjusted by sliding the sliding bracket along the top rail to a desired position, and then inserting a pin to lock the sliding bracket in place at a selected recline angle. In still further embodiments, the chair swivels a full 360 degrees in all of the various recline positions and yet maintain a stable, non-tipping configuration.

In some embodiments, the swivel of an outdoor use chair of the present invention is forward of the intersection of a first straight line drawn from the right front corner of the right top rail to the left rear corner of the left top rail and a second straight line drawn from the left front corner of the left top rail to the right rear corner of the right top rail that identifies a geometric center of the upper frame. In specific embodiments, a vertical axis of the center of the swivel located forward of the geometric axis of the upper chair frame (as described above), minimizes cantilever effects and downward flexion of the top chair frame when, for example, the outdoor use chair is in full recline position with the user's center of gravity furthest forward. In the absence of this orientation of the vertical axis of the center of the swivel forward of the geometric center of the upper chair frame, changing the recline angle of the outdoor use chair may generate an unstable and tilting platform that may jeopardize the safety of the user and others nearby. To the contrary, the present invention mitigates instability generated when a user's center of gravity is not directly over the top of the swivel, and further mitigates downward flexion of the upper frame that may otherwise make contact with the lower frame and thereby prevent the chair from freely swiveling. In other embodiments of the present invention, the top rails are constructed of a high tensile strength alloy to minimize flexing of the top rails. The forward position of the swivel relative to the top chair frame, and high tensile strength of the top rails allow the upper chair frame to rotate freely on the lower base frame independently of the recline angle of the outdoor use chair. In particular embodiments, the swivel of an outdoor use chair of the present invention is at or behind the intersection of a first straight line drawn from the right front corner of the right top rail to the left rear corner of the left top rail and a second straight line drawn from the left front corner of the left top rail to the right rear corner of the right top rail. In other embodiments, the position of the swivel is variably adjustable such that the vertical axis of the center of the swivel may be located to the rear of the geometric center of the upper frame, may be aligned with the geometric center of the upper frame, or may be in front of the geometric center of the upper frame at the preference of the user.

In some embodiments, an outdoor use chair and system of the present invention is light weight and collapses into a compact, low profile configuration that is easily transported to and from use locations via backpack straps. Many of the best hunting opportunities occur in remote and difficult to access locations. Conventional outdoor use chairs and systems are heavy, bulky and cumbersome, and have limited portability. In certain embodiments of the present invention, a low profile, folded configuration is achieved by moving the sliding bracket to the most rearward position on the top rail (i.e., adjacent to the stationary bracket), and inserting a pin to lock the outdoor use chair into its folded, transportable configuration.

In some embodiments, an outdoor use chair and system of the present invention comprises interchangeable camouflage shrouds and aprons to conceal the outdoor use chair in patterns that are matched to environmental conditions. Because environmental conditions change from locale to locale and from season to season, the present invention provides different camouflage patterns to achieve maximum concealment.

In some embodiments, an outdoor use chair and system of the present invention comprises a wide and stable base compatible with portability. Conventional outdoor use chairs are unstable and may generate safety hazards, particularly when the user's center of gravity is furthest from ground level. In certain embodiments, the angle between the foot and leg of the lower base frame generates a progressively wider and more stable base as the distance between the ground and the user increases when, for example, leg extensions are added.

In some embodiments, an outdoor use chair and system of the present invention comprises an apron affixed to the top of the seat back frame with, for example, zip ties or similar fasteners, and affixed to the sides of the chair frame with, for example, hook and loop (i.e., Velcro) fasteners to allow easy attachment and detachment to the sides of the chair frame. In conventional outdoor use chairs and systems, permanently affixing a camouflage apron to the chair frame restricts the collapsibility and portability of a blind system, and precludes the user's ability to interchange the camouflage patterns to match the existing environmental conditions. In certain embodiments, the present invention allows the user to roll and secure the camouflage apron beneath the top of the upper chair frame back for easy transport without fully detaching the fabric from the frame.

In some embodiments, an outdoor use chair and system of the present invention comprises aluminum components, although a diversity of other plastics, carbon fiber, steel or similar materials are suitable. In certain embodiments, the frame materials are powder coated, painted, anodized or treated with a diversity of other products to maximize concealment and weather and corrosion resistance.

In some embodiments, an outdoor use chair and system of the present invention comprises a fixed number of recline position options for simplicity. In other embodiments, the outdoor use chair accommodates a flexible number of recline positions. In certain embodiments, the outdoor use chair comprises a firearm support or rest integrated in the frame to provide a stable shooting rest.

In some embodiments, an outdoor use chair and system of the present invention comprises concealment over the front and top of the user by the use of a camouflage blanket. In other embodiments, an outdoor use chair of the present invention provides frame extensions over the front and the top of user such that the top and front of the user are concealed by the outdoor use chair frame itself in addition to or instead of a camouflage blanket.

In some embodiments, an outdoor use chair and system of the present invention is used in an indoor environment during, for example, a game as a spectator or participant, a viewer of live or recorded events, employment, or other work or recreation. In other embodiments, an outdoor use chair and system of the present invention is used in an outdoor environment during, for example, photography, astronomy, and sporting events.

In some embodiments, an outdoor use chair and system of the present invention is provided in a kit or system together with one or more of, for example, a camouflage shroud, a camouflage apron, spare and/or replacement parts and pins, a lubricant, a cleaning solution, linkages to attach other outdoor and hunting apparatuses, a beverage holder, detachable pockets, seat padding, flotation devices, a carrying case, packaging and instructions for use.

FIG. 1 shows a perspective side view of one embodiment of the invention. The user's front is facing to the right of the figure. In one embodiment, 1 comprises left and right top rails that further comprise stationary brackets 2, and sliding brackets 3. Upper cross braces 4 are affixed to left and right top rails 1, and are affixed to swivel 5. Left and right legs 6 are affixed to lower cross braces 8, and are affixed to swivel 5. Left and right legs 6 comprise feet 7. In some embodiments legs 6 further comprise leg extensions 9.

Figure 2:
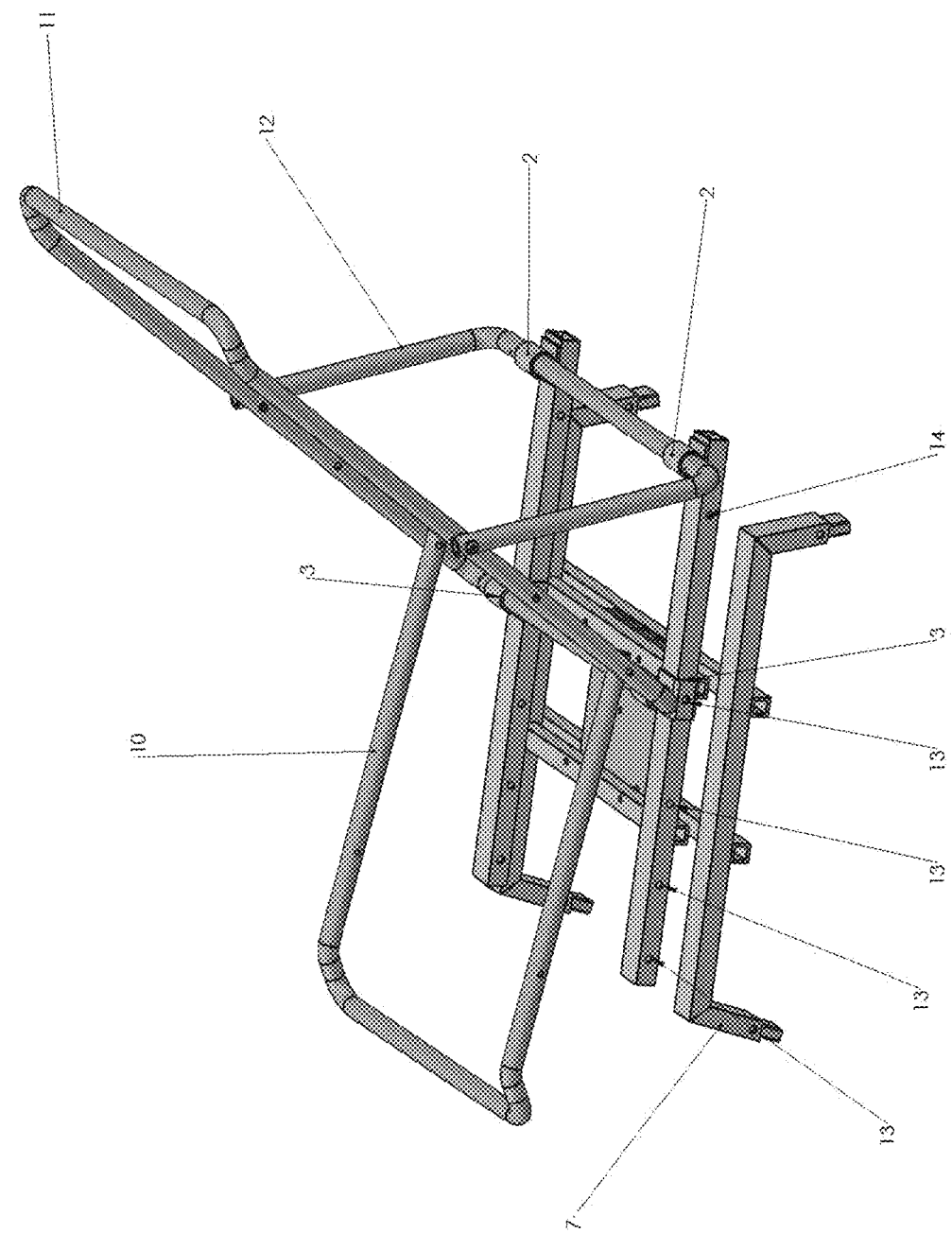
FIG. 2 shows a perspective side view of one embodiment of the invention. The user's front is facing to the left of the figure.

FIG. 2 shows a perspective side view of one embodiment of the invention. The user's front is facing to the left of the figure. In some embodiments, seat frame 10 is affixed to and/or pivots on seat back frame 11, and seat back frame 11 is affixed to and/or pivots on seat back support 12. In use, seat back frame 11 is able to rotate within sliding bracket 3, and seat back support 12 is able to rotate within stationary bracket 2 when, for example, a user adjusts the recline angle of the chair. Seat back angle adjustment aperture 13 accommodates a pin to secure sliding bracket 3 at a user-selected position along top rail 1 (top rail reference number 1 is shown and designated in FIG. 1). In FIG. 2, the chair is shown in an upright position. Top rail 1 further comprises folding transport aperture 14 for a pin to secure the outdoor use chair in its folding position for transport. In some embodiments, when a user has adjusted the outdoor use chair of the present invention to a preferred position and configuration, the user secures the sliding brackets to the top rails using, for example, a pin and ring for rapid insertion and removal, or a clamp and levered locking arm.

Figure 3:
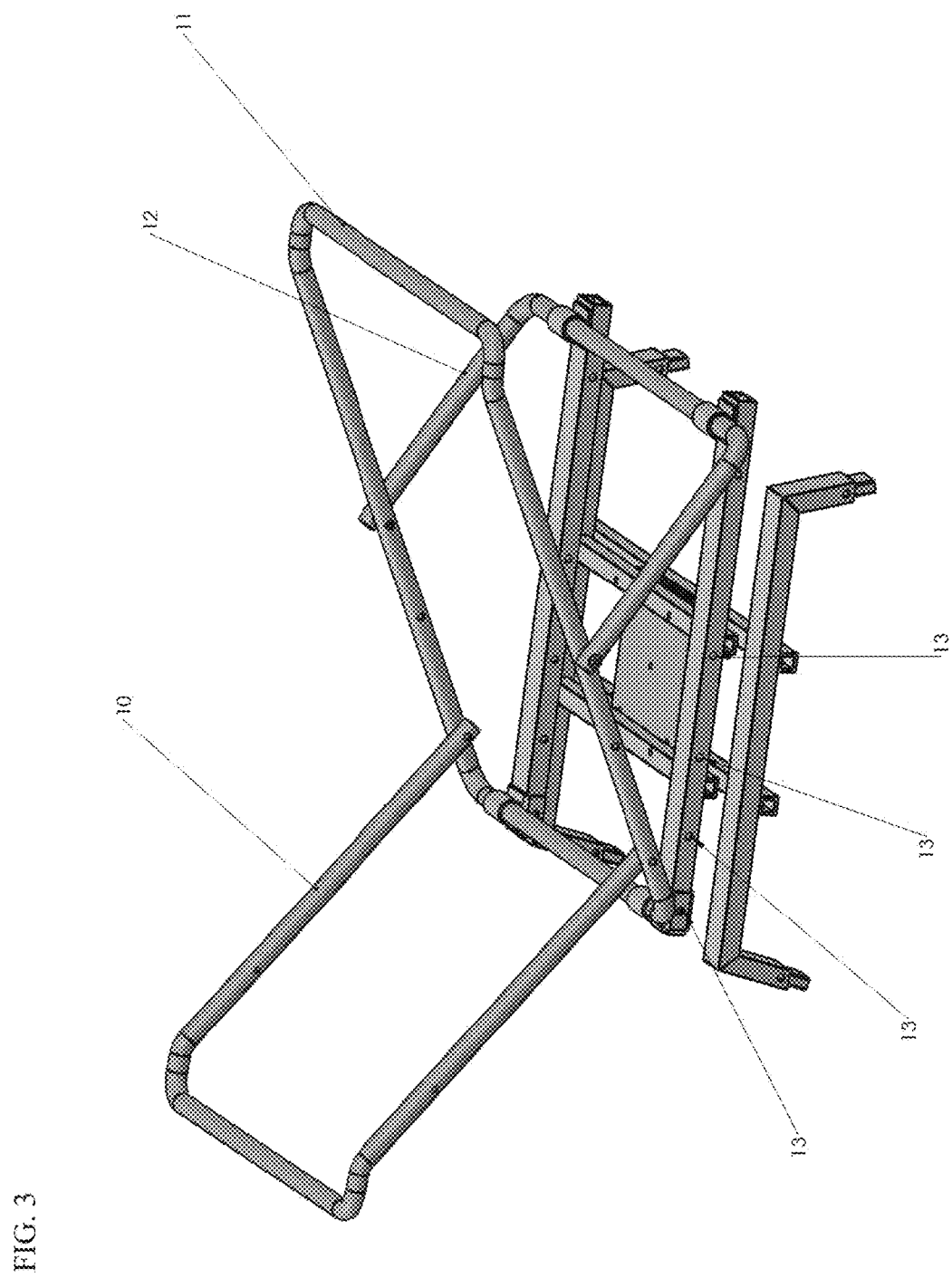
FIG. 3 shows a perspective side view of one embodiment of the invention. The user's front is facing to the left of the figure.

FIG. 3 shows a perspective side view of one embodiment of the invention. The user's front is facing to the left of the figure. In FIG. 3, the chair is shown in a flattened angle of recline. The forward-most seat back angle adjustment aperture 13 is used to position seat frame 10, seat back frame 11 and seat back support 12 in a full recumbent position.

Figure 4:
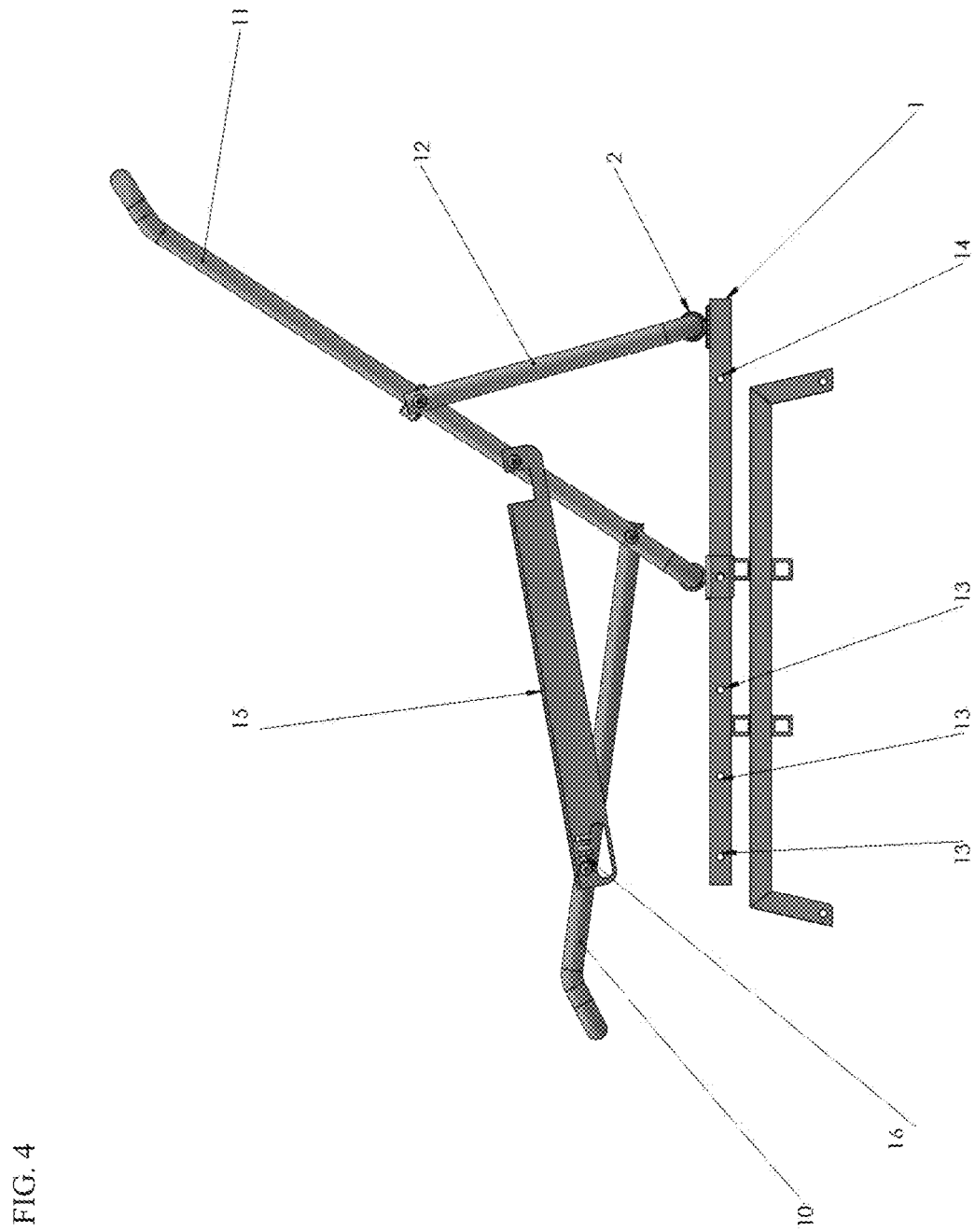
FIG. 4 shows a perspective side view of one embodiment of the invention in an upright position. The user's front is facing to the left of the figure.

FIG. 4 shows a perspective side view of one embodiment of the invention in an upright position. The user's front is facing to the left of the figure. In one embodiment, arm rest 15 rotates on seat back frame 11, and is affixed to a seat angle adjustment stud (seat angle adjustment stud reference number 28 is shown and designated in FIG. 11) by user selection of a seat angle adjustment slot 16 corresponding to a user's position of preference and comfort. In one embodiment, arm rest 15 is secured in position to support seat frame 10.

Figure 5:
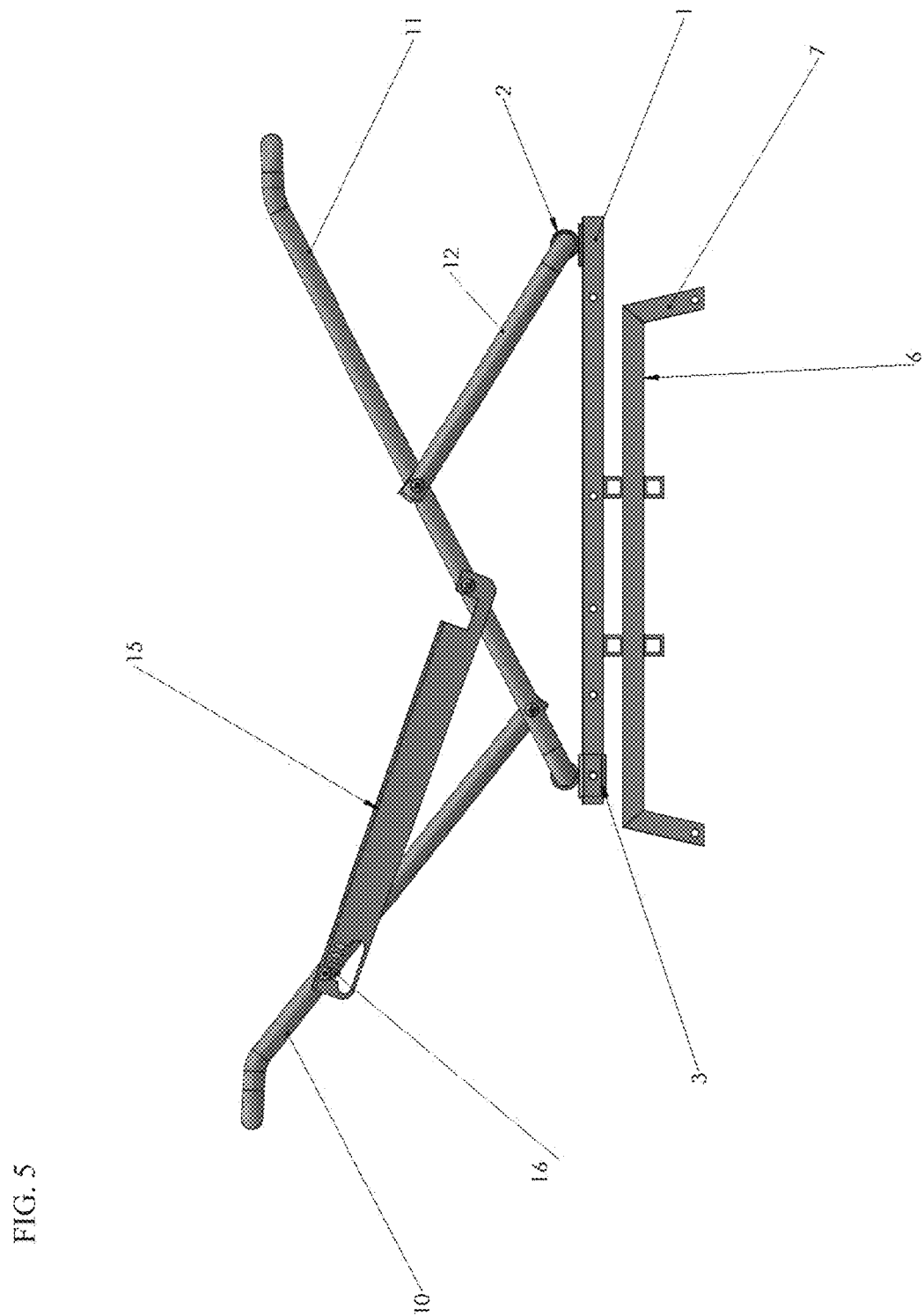
FIG. 5 shows a perspective side view of one embodiment of the invention in a reclined position. The user's front is facing to the left of the figure.

FIG. 5 shows a perspective side view of one embodiment of the invention in a reclined position. The user's front is facing to the left of the figure. In one embodiment, the seat angle adjustment slot 16 is selected for use in a recumbent position, although the user may select any slot to achieve a position of preference and comfort.

Figure 6:
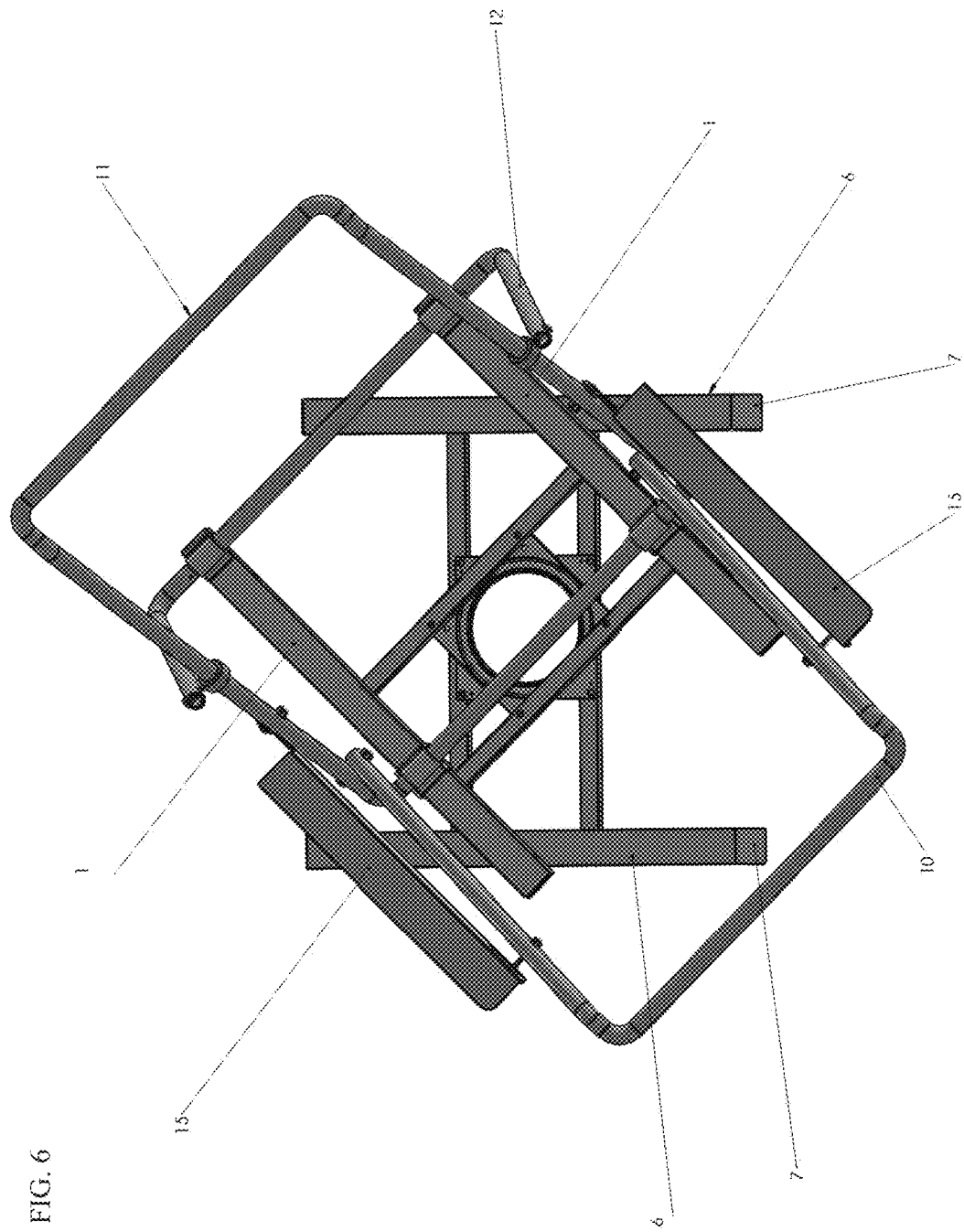
FIG. 6 shows a perspective overhead view of one embodiment of the invention. The user's front is facing to the lower left of the figure.

FIG. 6 shows a perspective overhead view of one embodiment of the invention. The user's front is facing to the lower left of the figure. In one embodiment, the chair comprising seat frame 10, seat back frame 11 and seat back support 12 rotates in a clockwise direction on swivel 5 (shown here rotated to 8 o'clock) (swivel reference number 5 is shown and designated in FIG. 1) to accommodate a user-selected field of view.

Figure 7:
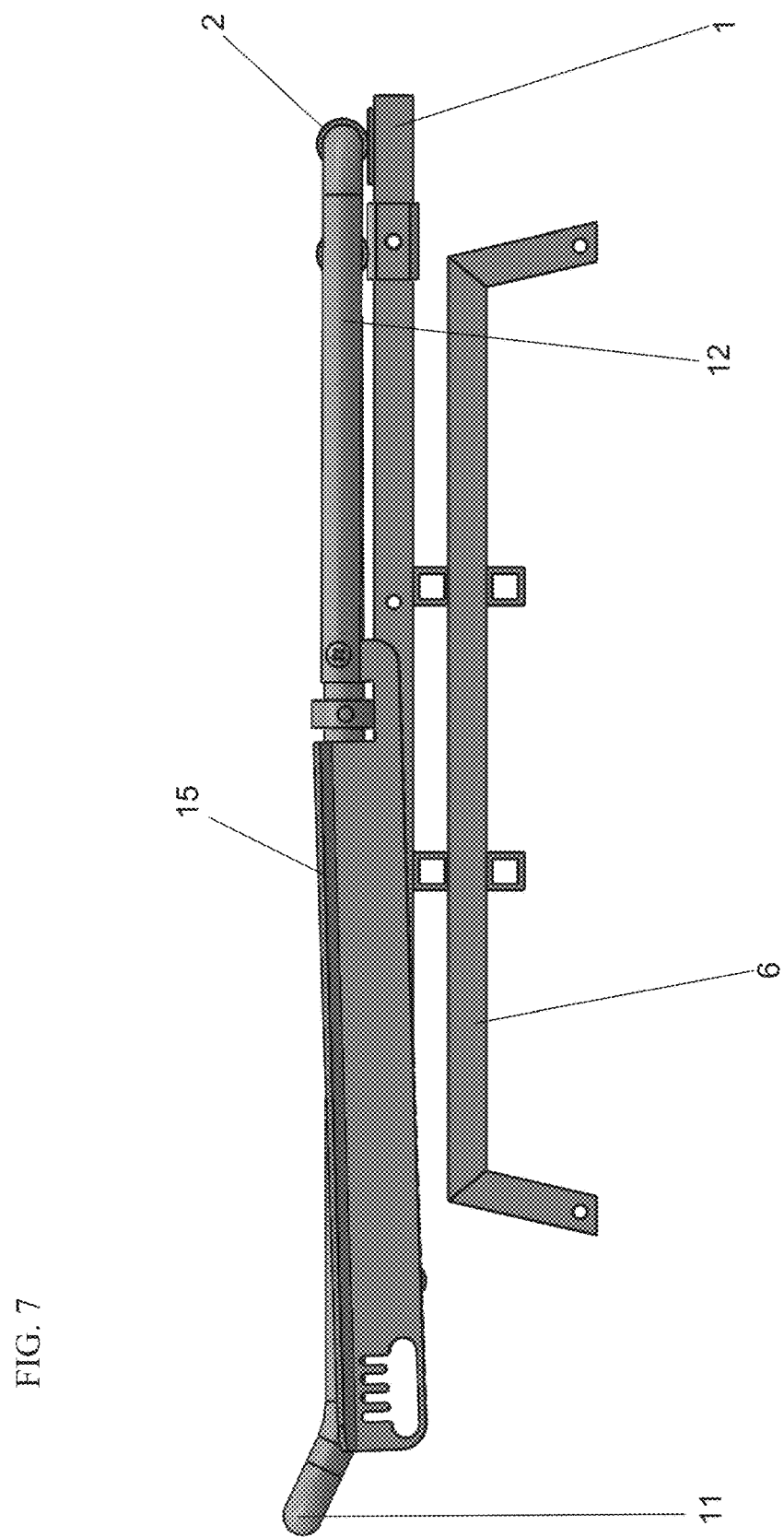
FIG. 7 shows a perspective side view of one embodiment of the invention in a folded configuration.

FIG. 7 shows a perspective side view of one embodiment of the invention in a fully folded configuration suitable, for example, in transport.

Figure 8:
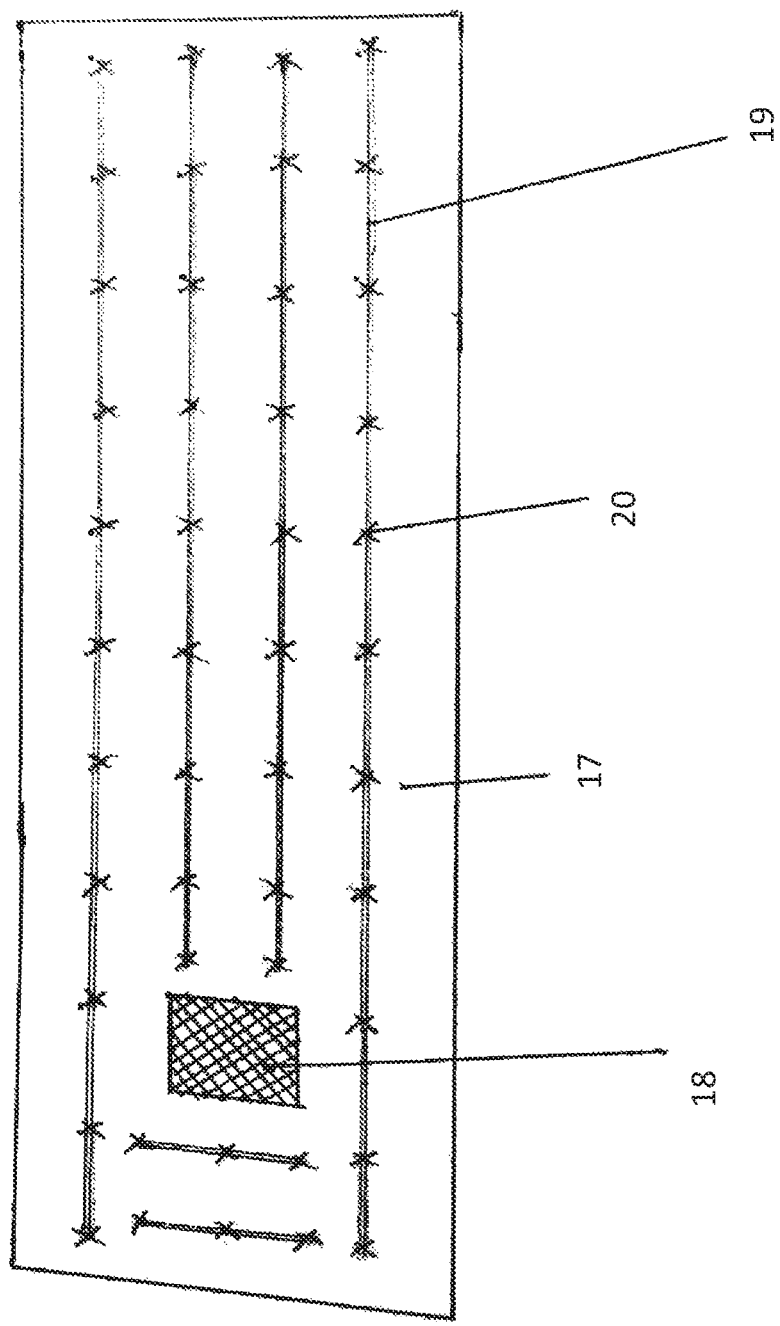
FIG. 8 shows an overhead view of one embodiment of the invention.

FIG. 8 shows an overhead view of one embodiment of the invention. The user's head is to the left. In one embodiment, the chair comprises a camouflage fabric top shroud 17 comprising camouflage window netting 18, one or more natural vegetation retaining straps 19, and one or more natural vegetation retaining strap anchor points 20.

Figure 9:
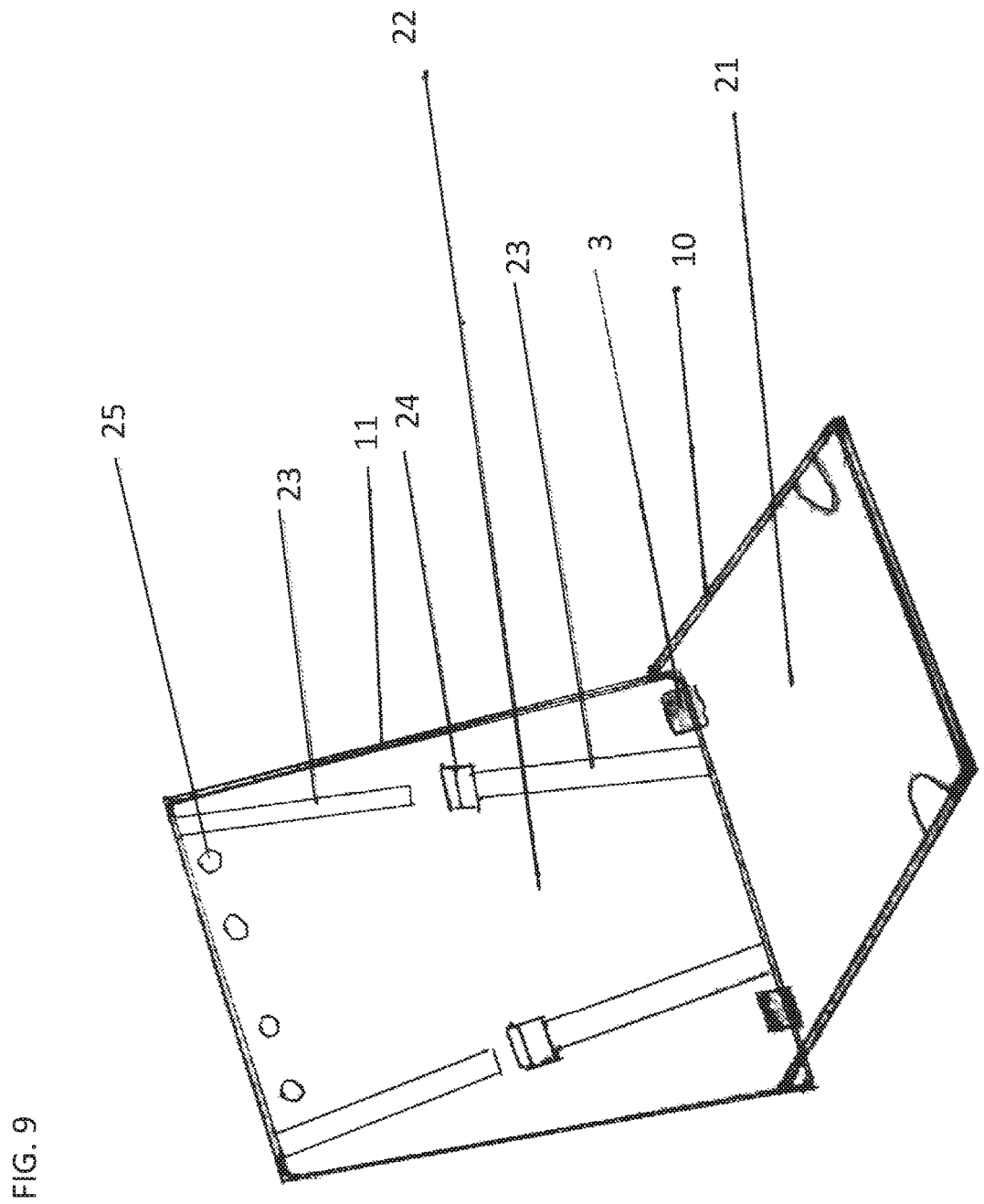
FIG. 9 shows a perspective frontal view of one embodiment of the invention. The user's front is facing to the lower right.

FIG. 9 shows a perspective frontal view of one embodiment of the invention. The user's front is facing to the lower right. In one embodiment, seat sling 21 is fitted to seat frame 10, and seat back sling 22 is fitted to seat back frame 11. In some embodiments, seat back sling 22 further comprises one or more backpack straps 23, one or more backpack buckles 24, and one or more grommets 25.

Figure 10:
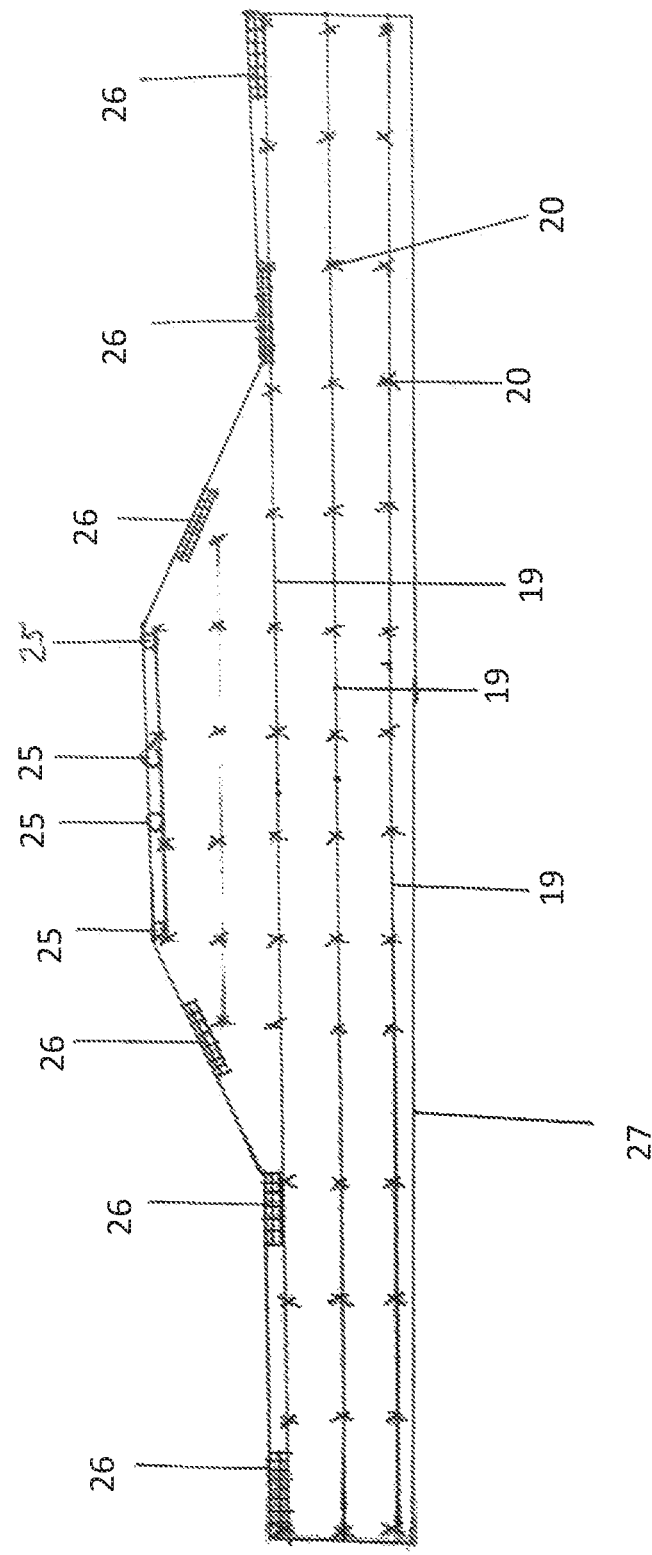
FIG. 10 shows a rear view of one embodiment of the invention.

FIG. 10 shows a rear view of one embodiment of the invention. In one embodiment, side and rear apron hook and loop fasteners 26 affix camouflage fabric apron 27 to seat back frame 11, and arm rests 15, and grommets 25 affix camouflage fabric side and rear apron 27 to seat back frame 11.

Figure 11:
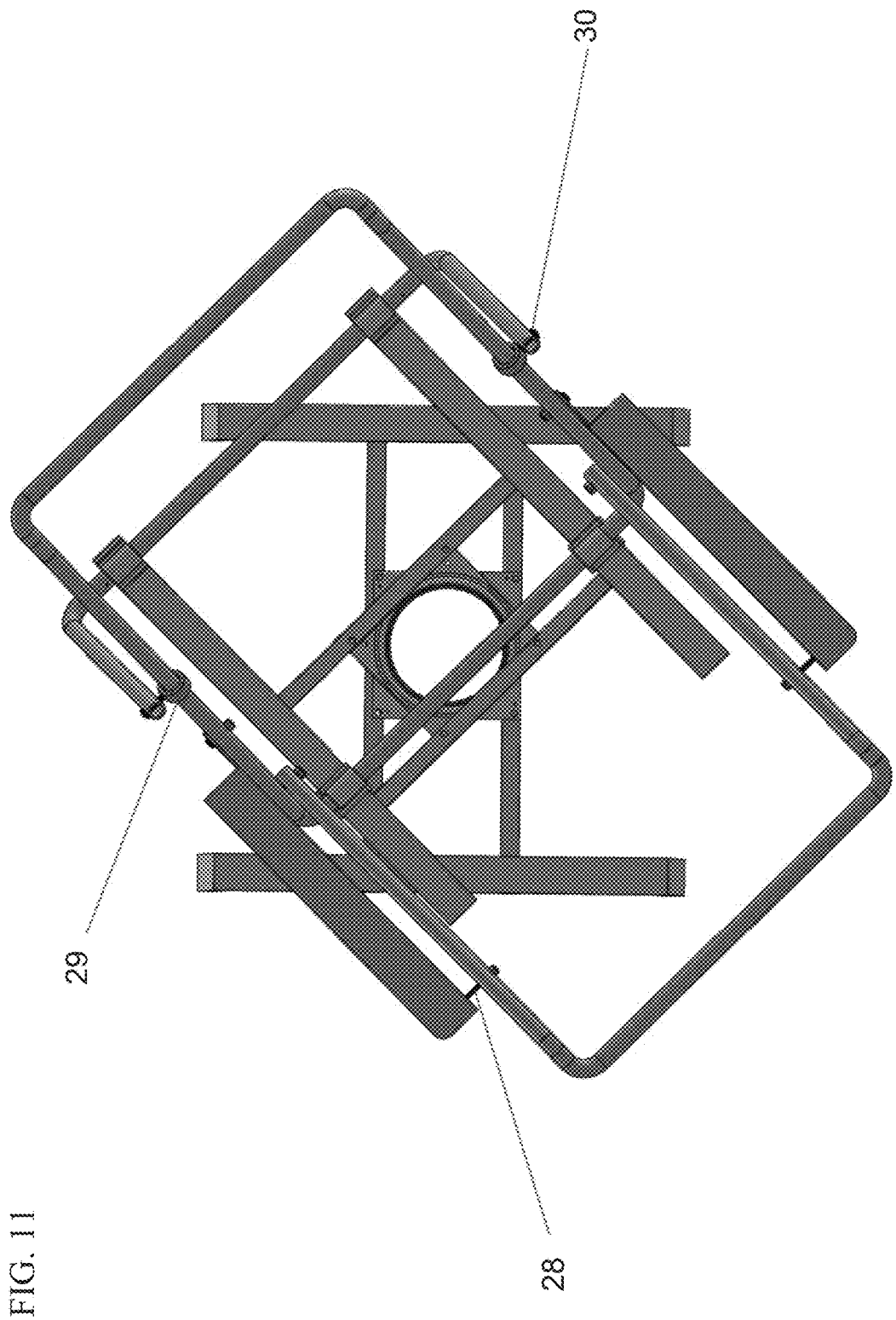
FIG. 11 shows an overhead view of one embodiment of the invention. The user's front is facing to the lower left of the figure.

FIG. 11 shows an overhead view of one embodiment of the invention. The user's front is facing to the lower left. In one embodiment, seat angle adjustment stud 28 secures a seat angle adjustment slot selected by a user (seat angle adjustment slot reference number 16 is shown and designated in FIG. 5). Shaft collar 29 connects the seat back frame to the seat back support, and is secured with shaft collar locking pin 30 (seat back frame reference number 11 and seat back support reference number 12 are shown and designated in FIG. 3). Shaft collar 29 encircles the seat back frame such that shaft collar 29 slides up and down the seat back frame as the user adjusts the recline angle.

Figure 12:
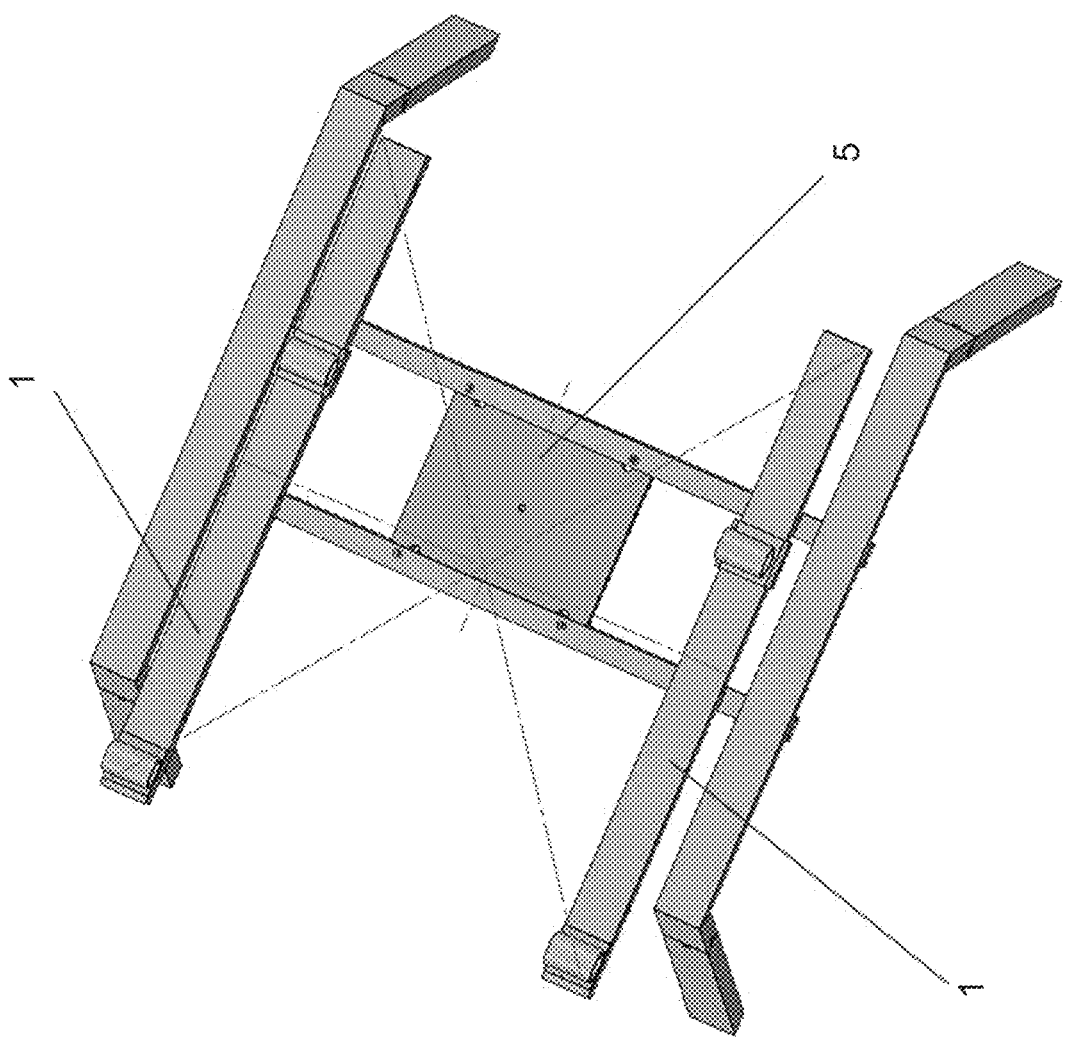
FIG. 12 shows an overhead vies of one embodiment of the invention. The user's front is facing to the lower right of the figure.

FIG. 12 shows an overhead view of one embodiment of the invention. The user's front is facing to the lower right. In one embodiment, a straight line drawn from the right front corner of the right top rail 1 to the left rear corner of the left top rail 1 (shown as a dashed line) intersects a straight line drawn from the left front corner of the left top rail 1 to the right rear corner of the right top rail 1 (shown as a dashed line) behind the center axis of swivel 5.

EXAMPLES

The following examples are provided in order to demonstrate and further illustrate certain embodiments and aspects of the present disclosure, and are not to be construed as limiting the scope thereof.

Example 1

A right-handed waterfowl hunter observes targets approaching 140 degrees to the left and just at his line of sight in a recumbent position. Using an outdoor chair of the present invention, the hunter rotates the chair to the left without destabilizing the chair, to achieve an optimal field of view without having to stand to attempt a shot, and thereby alerting the waterfowl.

Example 2

A hunter wishes to exert a minimal visual impact on the hunter's surroundings. Using a low profile configuration of an outdoor chair of the present invention to minimize silhouette, the hunter attaches a camouflage apron to encircle the chair, and a camouflage shroud to cover the top of the chair and hunter. Use of the chair's low profile swivel (e.g., 1" or less from top to bottom) mounted on the lower frame, adjusting the chair to a full recumbent position, and adjusting the foot height of the lower frame provides the hunter with a minimal silhouette.

Example 3

A hunter wishes to remain motionless during the possible approach of game. Using an outdoor chair of the present invention, the hunter adjusts the recline angle of the seat back frame by moving the sliding brackets along the top rails to achieve a position of greatest comfort with optimal field of view of the game's anticipated approach. Once the recline angle is chosen, pins are inserted through the sliding brackets and top rails, and a seat angle adjustment slot is chosen to lock the seat into the hunter's preferred position of comfort. Accordingly, the hunter is able to hunt from a diversity of comfortable bent-knee positions, and remain motionless for longer periods of time.

Example 4

An avid hunter pursues many different species as hunting seasons allow, but wishes to possess a single chair that is adaptable to diverse hunting opportunities. Using an outdoor chair of the present invention, the hunter uses the single chair in a maximum recline position for waterfowl field hunting, in an intermediate profile semi-upright position for turkey or predator hunting, and in a high-profile upright position for deer hunting. Adjusting the recline angle as above determines the height profile of the outdoor chair. To achieve greater above-ground elevation, the hunter attaches leg extensions to achieve a preferred height. Using a chair of the present invention, the hunter swivels a full 360 degrees in all recline and elevation positions without destabilizing or tilting the hunting chair on its frame.

Example 5

A hunter is aware of a preferred hunting opportunity 15 miles from the nearest vehicle access point, and must hike the distance carrying all of his gear. To avoid the weight, bulk and protuberances of conventional outdoor chairs and blinds, the hunter selects a light-weight chair of the present invention that collapses into a compact low profile configuration that is easily transported to and from remote hunting locations by integrated back pack straps. The hunter achieves the low profile folded configuration by moving the sliding brackets to their most rearward position (e.g., immediately adjacent to the stationary brackets), and inserting a pin to lock the chair into its folded, transportable configuration.

Example 6

To adjust camouflage requirements to meet diverse environmental conditions and seasonal variations, a hunter selects camouflage from multiple patterns suitable for Spring turkey hunting at the field edge of a pasture, fall waterfowl hunting in a marsh, fall waterfowl hunting in a cornfield, woodland deer hunting in Fall, and woodland deer hunting in Winter. The hunter reversibly affixes a selected apron camouflage pattern to the seat back frame through the grommets with zip ties or similar fasteners, and uses hook and loop (e.g., Velcro) fasteners to affix the apron to the seat back frame, arm rests and seat frame. After use, the hunter rolls the camouflage fabric for storage beneath the seat back frame for transport. In the transport and storage configuration, the camouflage apron may be detached from the chair frame at the Velcro fasteners, but remains reversibly attached to the top of the seat back frame via zip ties. Similarly, the seat sling and seat back sling may be changed to provide diverse camouflage patterns.

Various modifications and variations of the described method and system of the disclosure will be apparent to those skilled in the art without departing from the scope and spirit of the disclosure. Although the disclosure has been described in connection with specific embodiments, it should be understood that the disclosure as claimed should not be unduly limited to such specific embodiments. Indeed, various modifications of the described modes for carrying out the disclosure that are obvious to those skilled relevant fields are intended to be within the scope of the following claims.

I claim:

1. A chair for outdoor use, comprising:
   a) a seat comprising a seat frame;
   b) a seat back comprising a seat back frame;
   c) a seat back support;
   d) a left top rail, comprising:
      1. a stationary bracket; and
      2. a sliding bracket;
   e) a right top rail, comprising:
      1. a stationary bracket; and
      2. a sliding bracket
   f) a front upper cross brace affixed to said left top rail and to said right top rail;
   g) a rear upper cross brace affixed to said left top rail and to said right top rail;
   h) a left leg comprising a front foot and a rear foot;
   i) a right leg comprising a front foot and a rear foot;
   j) a front lower cross brace affixed to said left leg and to said right leg:
   k) a rear lower cross brace affixed to said left leg and to said right leg; and
   l) a swivel affixed to said front upper cross brace and said front lower cross brace and affixed to said rear upper cross brace and said rear lower cross brace.

2. The chair for outdoor use of claim 1, wherein at least one said sliding bracket and at least one said top rail comprises at least one chair back angle adjustment aperture.

3. The chair for outdoor use of claim 1, wherein at least one said sliding bracket and at least one said top rail comprises at least one folding transport aperture.

4. The chair for outdoor use of claim 1, further comprising at least one arm rest.

5. The chair for outdoor use of claim 4, wherein said at least one arm rest comprises at least one seat angle adjustment slot.

6. The chair for outdoor use of claim 1, further comprising a camouflage fabric top shroud.

7. The chair for outdoor use of claim 6, wherein said camouflage fabric top shroud comprises a camouflage window netting, a natural vegetation retaining strap, and a natural vegetation retaining strap anchor point.

8. The chair for outdoor use of claim 1, further comprising a seat sling.

9. The chair for outdoor use of claim 1, further comprising a seat back sling.

10. The chair for outdoor use of claim 9, further comprising a back pack strap buckle.

11. The chair for outdoor use of claim 1, further comprising a backpack strap.

12. The chair for outdoor use of claim 1, further comprising a camouflage apron.

13. The chair for outdoor use of claim 12, wherein said camouflage apron comprises a side apron hook and loop fastener, or a grommet.

14. The chair for outdoor use of claim 1, further comprising one or more leg extensions configured to be reversible affixed to one or more of said front foot of said left leg, said rear foot of said left leg, said front foot of said right leg, and said rear foot of said right leg.

15. The chair for outdoor use of claim 1, wherein the vertical axis at the center of said swivel is forward of the intersection of a first straight line drawn from the right front corner of the right top rail to the left rear corner of the left top rail and a second straight line drawn from the left front corner of the left top rail to the right rear corner of the right top rail.

16. A kit, comprising:
   a) the chair for outdoor use of claim 1; and
   b) one or more of a leg extension, a camouflage shroud, a camouflage apron, spare and/or replacement parts and pins, a lubricant, a cleaning solution, linkages to attach other outdoor and hunting apparatuses, a beverage holder, detachable pockets, seat padding, flotation devices, a carrying case, packaging and instructions for use.

17. A system, comprising:
   a) the chair for outdoor use of claim 1; and
   b) one or more of a leg extension, a camouflage shroud, a camouflage apron, spare and/or replacement parts and pins, a lubricant, a cleaning solution, linkages to attach other outdoor and hunting apparatuses, a beverage holder, detachable pockets, seat padding, flotation devices, a carrying case, packaging and instructions for use.

* * * * *